Aug. 31, 1937.  O. ENGLER ET AL  2,091,587
REVOLVING GRATE
Filed Jan. 18, 1936    8 Sheets-Sheet 1

Inventors
Otto Engler,
Heinrich Peperkorn,

Attorneys

Inventors
Otto Engler,
Heinrich Peperkorn,

Attorneys

Aug. 31, 1937.  O. ENGLER ET AL  2,091,587
REVOLVING GRATE
Filed Jan. 18, 1936    8 Sheets-Sheet 4

Inventors
Otto Engler,
Heinrich Peperhorn,
Attorneys

Aug. 31, 1937.  O. ENGLER ET AL  2,091,587
REVOLVING GRATE
Filed Jan. 18, 1936   8 Sheets-Sheet 7

Inventors
Otto Engler,
Heinrich Peperkorn,

Attorneys

Aug. 31, 1937.    O. ENGLER ET AL    2,091,587
REVOLVING GRATE
Filed Jan. 18, 1936    8 Sheets-Sheet 8

Inventors
Otto Engler,
Heinrich Peperkorn,

Attorneys

Patented Aug. 31, 1937

2,091,587

UNITED STATES PATENT OFFICE 2,091,587

REVOLVING GRATE

Otto Engler and Heinrich Peperkorn, Kassel-Wilhelmshohe, Germany, assignors to Schmidt-'sche Heissdampf-Gesellschaft m. b. H., Kassel-Wilhelmshohe, Germany Application January 18, 1936, Serial No. 59,772
In Germany January 19, 1935

20 Claims. (Cl. 110—36)

The invention relates to a revolving grate, particularly for the furnaces of steam generators or the like, and especially to such a grate which comprises two or more superposed discs. The invention consists broadly in arranging the rotational axes of two consecutive discs out of alignment with each other, and in providing means to force the fuel on the upper disc to move out of its normal path and to pass onto the lower disc at a point angularly displaced in a direction opposite the direction of rotation of the discs from the point at which the lower disc extends farthest out from beneath the upper disc.

The advantage obtained according to the invention is that the fuel describes a spiral path on the individual grate discs, thus providing a longer combustion path on the grate. In addition, by reason of the relative movement of the discs, deposition of slag and ashes on the surface of the individual discs is avoided; and automatic cleaning of the surfaces of the grate discs below the uppermost disc is effected by the relative movement of the lower disc beneath the upper disc, this movement being caused both by the eccentric mounting of the discs and in some instances, by differences in the rotational speed thereof.

According to a preferred embodiment of the invention, a revolving grate is provided which comprises three superposed grate discs, the rotational axis of the central grate being disposed eccentrically to the common rotational axis of the upper and lower disc, and the three discs are driven at substantially the same angular velocity in the same direction. The advantage of this arrangement is that the layer of fuel on the grate surface is prevented from being torn apart or scattered as it passes from one disc to the next. The layer of coal is distributed substantially uniformly over the entire grate surface, as the fuel, on leaving one grate disc, passes to the next lower one at the same angular velocity and in the same direction. In this case fresh fuel is preferably delivered in the vicinity of the outer periphery of the grate, so that the dimensions of the grate surfaces on the individual discs diminish from top to bottom, in accordance with the rate of consumption of the coal.

Further objects and advantages of the invention will appear more fully from the following description, particularly when taken in conjunction with the accompanying drawings which form a part thereof.

In the drawings:

Figs. 3 to 6 show a furnace plant with the fuel delivery opening located approximately at the center of the grate, and embodying two superposed rotatable grate discs. In these figures:

Figure 1:
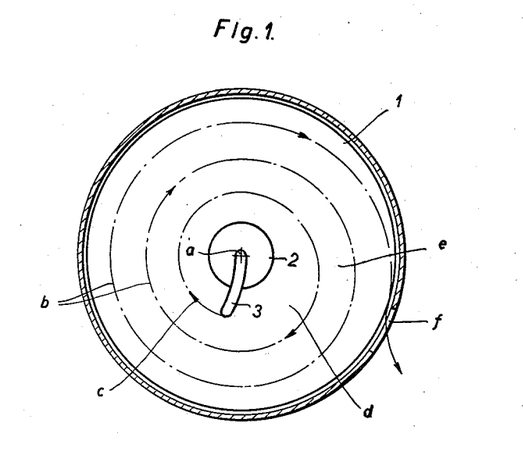
Figs. 1 and 2 show schematically the approximate path of the fuel on two different arrangements of grate discs. (The actual course of the combustion path differs somewhat from the approximate path, as the expansion and consumption of the fuel must be taken into consideration.)

The essential features and operation of the revolving grate of the present invention are explained with reference to the simplified Figs. 1 and 2 of the drawings. In both figures it is assumed that the fuel is introduced approximately at the center of the grate on the upper disc 1, which revolves about its central vertical axis $a$, or, in other words, is symmetric about its axis of rotation. The fuel, for example coal, is supplied to disc 1 from an approximately vertical feed shaft (hopper or the like). The lower discharge opening 2 of this shaft, in the construction of Fig. 1, is arranged so that its vertical central axis coincides with the axis of rotation $a$ of grate disc 1. The fuel dropping from opening 2 on disc 1 would, without suitable precautions, move with the disc in an approximately circular path and would thus not be distributed over the entire width of the disc. Means are therefore provided to force the fuel out of the circular path so that it describes approximately a progressive spiral movement, indicated in Figs. 1 and 2 by a broken line $b$. This movement takes place in the following manner:

In the embodiment of Fig. 1, the feed shaft is provided, at its discharge opening 2, with a guide or diverting wall 3 which extends outwardly into the path of the fuel. The fuel which, on passing from the discharge 2, forms a layer of a thickness determined by the distance of the lower edges of the discharge opening from the surface of the grate disc 1, moves with the rotatable disc 1, first in an approximately circular path from the front of the guide wall 3, in the direction of the arrow c, toward the other or rear side of guide wall 3. There, approximately at the point d, the advancing fuel is dammed or piled up through the resistance of wall 3 and the force of fuel pushing from the rear. As the force exerted by the descending fuel column in the discharge 2 and the feed shaft is quite large, and forces the moving fuel layer to continue its motion, the latter can only turn outwardly at the point d. The fuel layer then advances from the point d in an approximately circular path, from which, however, it is then forced outwardly, about at the point e which is somewhat in advance of the point d, by the back pressure of further fuel arriving at the point d. This pressure outwardly from a circular to an approximately spiral path is repeated continuously until the fuel layer reaches the outer edge of disc 1, at which point the fuel passes over onto the next lower disc at about the point f.

The fuel layers thus describe on grate disc 1 a path which is long in proportion to its surface, thus assuring good efficiency and thorough consumption of the fuel. By forcing the layer of fuel to move in this manner, fresh unconsumed fuel may be fed continuously from the outlet 2.

Figure 2:
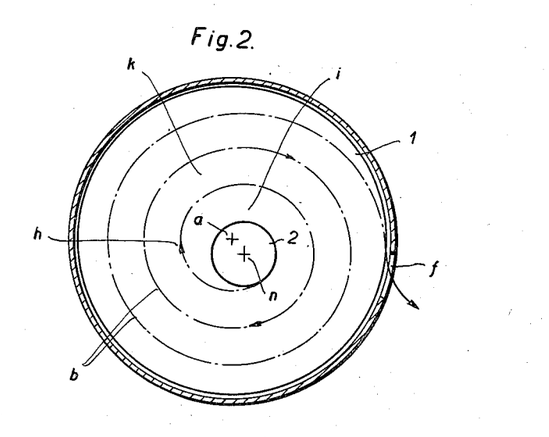

According to the construction of Fig. 2, a different mode of producing the spiral path of the fuel is used. The discharge opening 2 of the feed shaft is so disposed with respect to the grate disc 1 that the central vertical axis n of opening 2 is eccentric to the axis of rotation a of the disc. The fuel issuing from the outlet 2 thus moves first with disc 1 circularly about the rotational axis a of the disc 1 in the direction of the arrow h. In the first part of the travel of the fuel, its circular path tends to move progressively away from the discharge 2, to reach a maximum distance and then again to approach the discharge outlet. This causes the fuel passing down from the discharge 2 to dam up at the point at which the fuel layer, advancing in its circular path, starts to approach the outlet 2. The result is, as in the form of Fig. 1, that the advancing fuel layer must deviate outwardly at this point, for example at the point i. From there on the movement proceeds again in an approximately circular path, from which the fuel layer is again forced outwardly, at point k which is slightly in advance of point i, through the back pressure of the succeeding fuel arriving at point i. These operations are repeated as in Fig. 1 until the fuel reaches the point f at which it passes off the disc.

Figure 3:
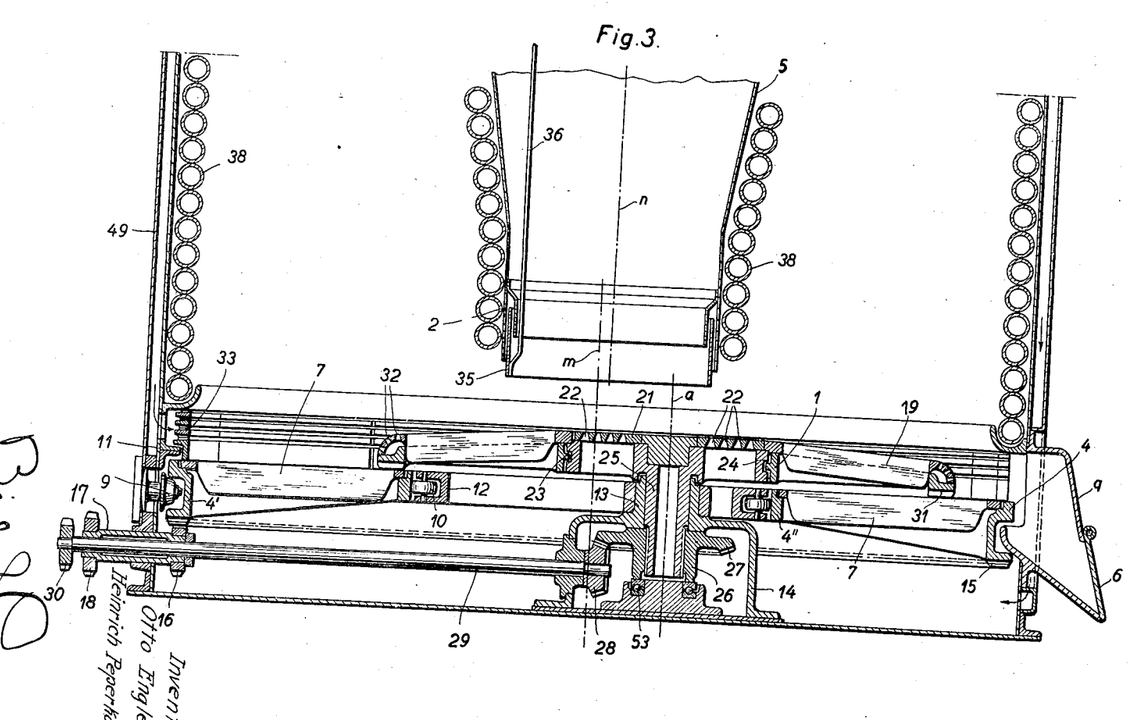
Fig. 3 shows the furnace plant in vertical section.
Figure 4:
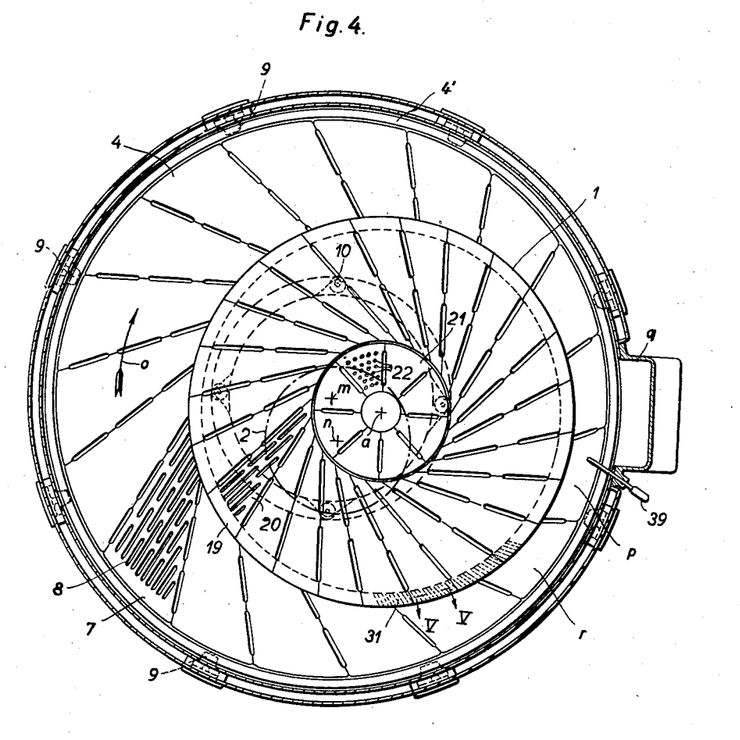
Fig. 4 is a plan view of the grate.
Figure 5:
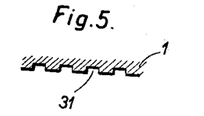
Fig. 5 is a detail cross section on line V—V of Fig. 4.

Figs. 3 to 5 show a furnace utilizing the principles just described. In these figures, the arrangement consists of an upper disc 1, a lower disc 4, and a fuel feed shaft 5 provided with a discharge opening 2. In Fig. 4, the vertical axis of rotation of the lower disc 4 is indicated at m, the vertical axis of rotation of the upper disc 1 at a and the vertical central longitudinal axis of the outlet 2 at n. As shown in Fig. 4, the axis m of the lower disc 4 and the axis a of the upper disc 1 are arranged eccentric to or out of alignment with each other, and the central longitudinal axis n of the outlet 2, representing the center of the area to which fuel is fed, is not disposed on the line connecting the two axes a and m, but is angularly displaced from this connecting line in a direction opposite the direction of rotation (indicated by arrow o) of grate discs 1 and 4. The object of this arrangement is explained hereinafter.

The construction of the revolving grate system is shown in these figures. The lower disc 4 consists of outer and inner circular rings 4', 4'' which are covered or closed with sector-shaped grate bars 7, which are provided with longitudinal slots 8 for the passage of combustion air (Fig. 4). The outer circular ring 4' rests on and is guided by rollers 9, and the inner ring 4'' is guided rotatably by rollers 10. The rollers may be replaced by any other suitable type of guides or supports. The rollers 9 are journalled in the housing or casing 11 of the steam generator, while the rollers 10 are mounted on a stationary crown 12, the hub of which is mounted on the neck 13 of a bearing block or support 14. The outer ring 4' is provided on its lower side with a crown gear 15, which meshes with a gear 16 on a hollow shaft 17. This shaft, in turn, is driven from a suitable source of power, for example through a gear 18, or in any other fashion, so that the annular disc 4 turns on rollers 9 and 10 around the stationary ring 12.

The outer part of upper disc 1 is composed of sector-shaped grate bars 19 which are provided with air slots 20, while the sector-shaped grate bars 21 which make up the central part of the disc are provided with air openings 22 (Figs. 3 and 4). Disc 1 is connected by a bayonet joint 23 with a central ring member 24, so that the disc 1 may rise slightly if it becomes warped. The hub 25 of the central member 24 extends downwardly, and secured to it is the hub 26 of a bevel gear 27 rotatable on a thrust ball bearing 53'. A bevel gear 28 on a shaft 29 meshes with gear 27. This shaft 29 extends out through the hollow shaft 17 and is driven by a source of power, for example through a gear 30, or in some other way, so that the disc 1 moves over the surface of the lower disc 4. The outer edge of disc 1 is provided at its lower side with inclined, obliquely directed teeth 31 (Fig. 5), the object of which is to crush or comminute any fuel which may escape downwardly through the air openings 20 of the grate bars 19, and thrust it outwardly onto the lower disc 4, and to prevent the penetration of fuel from the lower disc beneath the upper disc as far as possible. The same object could be accomplished in any other way, and it should be understood that the invention is in no way limited to the use of ribs which extend only for a short distance inward from the edge of the disc. In addition, the front side of the outer edge of upper disc 1 is provided with air slots 32 (Fig. 3), intended to prevent caking of fuel, cinders or slag on this front surface. Furthermore, there is provided above the lower disc 4, on the casing 11 of the fire box, a grate-like protective wall 33, the purpose of which also is to permit the passage of combustion air at this point to the space above the grate, and thereby prevent adhesion or caking of slag. As a result of the entrance of this relatively cold air, the liquid slag is caused to solidify, and the formation of large slag deposits is thereby prevented. The effect of this feature is further increased since the fuel is in continuous movement on the grate, which in itself renders deposition or caking of unconsumed fuel very difficult.

The operation of this grate consisting of two rotatable discs 1 and 4 may be easily comprehended from the preceding description of the principle of the invention with reference to the somewhat diagrammatic examples of Figs. 1 and 2.

As the vertical central axis $n$ of the discharge 2 is disposed eccentrically with respect to the axis of rotation $a$ of upper disc 1, the fuel passing from the outlet 2 onto the upper disc 1 describes the spiral movement explained with reference to the construction of Fig. 2. It then is forced, by the constant backing up of the fuel, onto the lower disc 4, the axis of rotation $m$ of which is disposed eccentrically with respect to the axis $a$ of upper disc 1. Consequently, the fuel on lower disc 4 also moves along a spiral path, so that its distance from the disc 1, as it moves in the direction of the arrow $o$ (Fig. 4), first increases and on further motion again decreases. This decrease in the distance of the fuel from disc 1 takes place at a point in advance of the narrowest point $p$ (Fig. 4) between the peripheries of discs 1 and 4. The fuel backs up and is forced outwardly here. Hence, the discharge $q$ for the slag, cinders and ashes is provided adjacent this point.

In addition to the increase in the length of the combustion path for the fuel and the relative movement of the fuel paths, the invention provides a further essential advantage. The ignition of the freshly fed fuel takes place on upper disc 1. It burns only on the surface, so that no slag can form there. Complete combustion takes place on lower disc 4. As a result of the relative movement of the discs the surface of the lower disc is automatically cleaned, as the disc 1 moves over the lower disc 4. The rates of revolution of the discs are selected by suitable construction of the drive mechanism so that the upper disc revolves faster than the lower disc.

Figure 6:
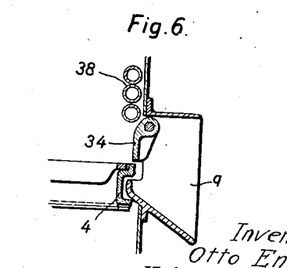
Fig. 6 shows a modified form of gate for the outlet opening of the rotary grate.

A discharge chute covered by a drop plate 6 (Fig. 3) may be provided at the discharge point $q$ for the fuel residues. Preferably, however, a swinging gate 34 (Fig. 6) is provided which forms the closure for the discharge opening. The swinging gate may be provided at any other suitable point. A longitudinally adjustable blade or stripper 39 (Fig. 4) extending into the path of the fuel on lower disc 4 may be provided at the point $q$ for regulating the amount of slag and ash discharged from the disc.

If the outlet 2 were arranged so that its vertical central axis $n$ coincided with the rotational axis $m$ of lower disc 4, it might occur that, in advance of the dam point where the fuel tends to pile up on disc 1 (that is, where the fuel on the upper disc 1 moves back toward the outlet 2, and the fuel is thus forced outwardly and finally passes over to the lower disc 4), a certain part of the surface of lower disc 4 would be without fuel. This is prevented by the fact that, according to the construction of Figs. 3 to 6, the axis $n$ of the outlet 2 is angularly displaced towards a point $r$ (Fig. 4) in a direction opposite the direction of rotation of the grate (indicated by arrow $o$), so that the fuel is forced off sooner onto the lower disc.

The point, where the section of the lower disc between the peripheries of the eccentrically mounted discs 1 and 4 is narrowest, is preferably of such width that the fuel, so as to attain good combustion, must describe several successive revolutions on the lower disc 4 before it reaches the outer edge of the disc.

An annular slide 35 is provided at the lower end of the fuel discharge 2, in the embodiment shown in Figs. 3 to 6, for regulating the height of the fuel layer on the upper grate disc. This slide may be raised and lowered by means, for example, of connecting rods 36 (Fig. 3) which pass up through the discharge 2 and the feed shaft 5. In the form here shown the two-disc revolving grate forms the furnace floor or grate of a tubular coil steam generator. Disposed in the fire box above the grate is the vaporizing heating surface, consisting of coils of tubes 38 to which a superheater (not shown) can be connected at the top.

The combustion chamber is provided with a double-walled jacket 11, 49. The space between the inner jacket 11 and the outer jacket 49 serves for preheating the combustion air, which is supplied at the upper end of this space and passes at the lower end beneath the grate (Fig. 3, right) as well as through the protective wall 33 above the grate (Fig. 3, left).

For driving the grate discs, use may be made of any suitable arrangement other than that shown on the drawings.

It is apparent from the foregoing that, with the use of two rotatable discs, the lower disc is kept automatically clean, and that the path of combustion is substantially increased as compared with the use of only one disc. This effect can be increased still further if use is made of more than two revoluble discs mounted one above the other. There are various possibilities of assembling such discs. It is preferable, as stated with reference to the embodiment of Figs. 3 to 6, to arrange the axes of rotation of two successive discs eccentrically with respect to each other. Also, each disc may rotate about its own central axis or about an eccentric axis (that is, one eccentric to the central axis of the disc), or the arrangement may be one in which only the lowermost disc rotates about its central axis, while the other discs rotate about eccentrically positioned axes. Finally, with the use of a plurality of discs, the alternate discs may rotate about one common axis, and the discs therebetween on a second common axis which, however, is displaced relative to the first axis.

In the form described above, it will be noted that the fuel is delivered approximately at the center of the furnace, and that the fuel residues are discharged at the periphery thereof. However, the reverse arrangement, shown in Figs. 7 to 10 is also possible and advantageous within the scope of the inventive concept. This arrangement also provides a combustion path for the fuel which is relatively long with respect to the surface of the grate if, according to the invention, means are provided to force the fuel from a circular into a spiral path which, in contrast to the embodiments described above, extends from the outside inwardly. Furthermore, when a plurality of superposed revoluble discs are used, the surface of the lower discs are kept automatically free from slag depositions.

Figure 7:
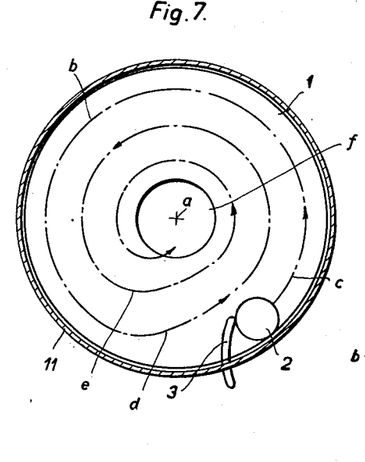
Figs. 7 and 8 are diagrammatic showings of the approximate path of the fuel on the grate in two other embodiments of the invention in which the fuel is introduced adjacent the outer margin of the grate disc.
Figure 8:
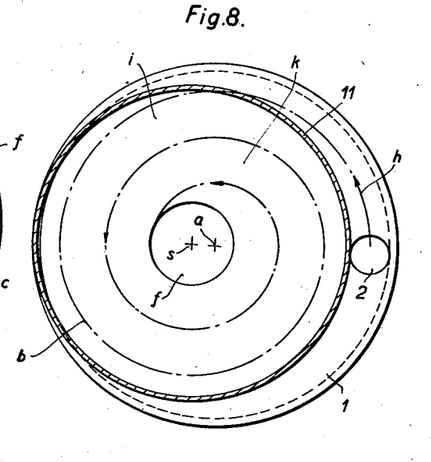

In the simplified, diagrammatic views of Figs. 7 and 8 the same reference characters are used to designate the same parts as in the simplified views of Figs. 1 and 2.

In order to simplify the explanation only one rotatable disc 1 is shown, which rotates about its vertical central axis $a$. The fuel is delivered through the outlet 2 of the feed shaft at the outer marginal portion of disc 1 and moves therewith first in the direction of the arrow $c$ along a circular path until it is forced inwardly by a suitable resistance.

In the form of Fig. 7 the resistance which forces the fuel inwardly is provided at the point $d$ by the back pressure of the fuel coming down from the outlet 2. For aiding this action, a suitably shaped guide or diverting wall 3 can be provided at the discharge 2, as in Fig. 1. From the point $d$ the fuel moves again in an approximate circular path, from which it is again forced inwardly by the back pressure of the fuel at point $d$, at a place in advance of this point, about at the point $e$, and so successively until finally it passes to the lower grate discs at the point $f$. The fuel thus describes a path indicated by the line $b$ on grate disc 1.

In Fig. 7 it is assumed that the axis of rotation $a$ of disc 1 coincides with the vertical central axis of the fire box jacket 11. In Fig. 8, on the contrary, the axis of rotation $a$ of disc 1 is eccentric to the vertical central axis $s$ of fire box jacket 11. The fuel is delivered to the grate 1 through the outlet 2 of the fuel feed shaft (not shown) at the outer edge of disc 1, and at a point outside of jacket 11. The fuel could also be supplied at the opposite side of disc 1, inside of jacket 11. The fuel moves in the direction of the arrow $h$ from outlet 2 first below the lower edge of jacket 11 (which is for this reason spaced slightly above the disc at this point) to the interior along a circular path, until it reaches the point furthest from outlet 2. It then moves again towards outlet 2, and thereby approaches the inner wall of jacket 11 which, on this side, is brought down to the disc 1 and thus acts as a resistance or guide wall to force the fuel inwardly from its circular path. The inward diversion of the fuel starts at the point $i$, from which point on the fuel moves in a circular path about the central line of the furnace as an axis. As a result of the back pressure of fuel at point $i$, the fuel in its next revolution is again forced inwardly somewhat in advance of this point, about at the point $k$. Finally the fuel passes at the point $j$ adjacent the center of disc 1 onto the next lower disc, after having traversed the path shown in Fig. 8 by the line $b$.

Figure 9:
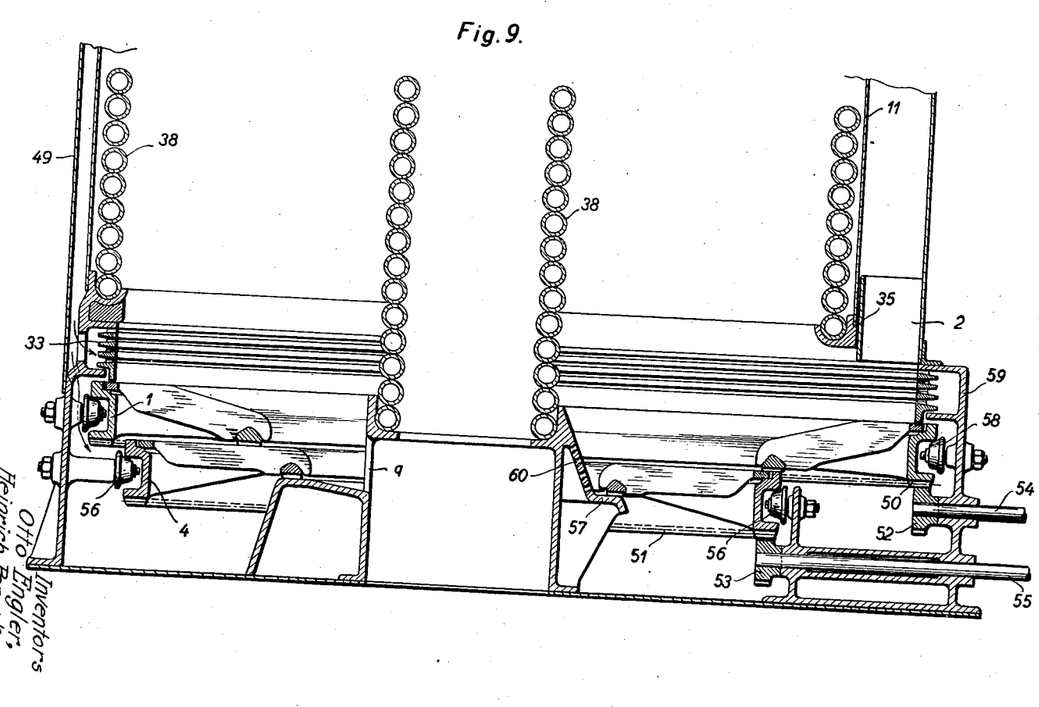
Fig. 9 shows in vertical axial section a furnace plant with rotary grates of the type shown in Figs. 7 and 8.
Figure 10:
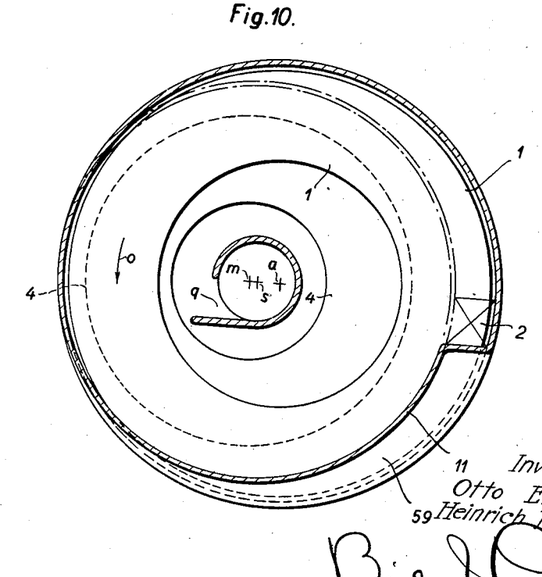
Fig. 10 shows the grates of Fig. 9 in diagrammatical view.

In the embodiment of Figs. 9 and 10 the grate comprises two superposed rotatable discs operating in the manner described above in connection with Figs. 7 and 8.

The arrangement comprises an upper grate disc 1 and a lower disc 4. The upper disc 1 rotates about its vertical central axis $a$ and the lower disc 4 about its central vertical axis $m$. These two axes are out of alignment with each other and with the central vertical axis $s$ of fire box jacket 11. Discs 1 and 4 rotate in the same direction as shown by the arrow $o$ (Fig. 10). For this purpose the discs 1 and 4 are provided at the lower sides of their outer edges with crown gears 50 and 51 respectively, which mesh with gears 52 and 53 on drive shafts 54 and 55. The lower disc 4 is guided at its outer periphery on rollers 56, while its inner ring slides on a stationary crown or guide 57. Upper disc 1 is provided at its outer edge with guide rollers 58, while its inner edge rests on the surface of lower disc 4.

As the upper disc 1 is eccentric to the axis $s$ of the jacket 11, a portion of the surface of this disc is outside of jacket 11. The fuel is delivered to this portion, which is shut off from jacket 11 and enclosed by a housing 59, through the discharge opening 2 of the fuel feed shaft. The fuel describes on upper disc 1 the movement shown in Fig. 8, from the outside inwardly, being forced inwardly by the back pressure created by the inner wall of the jacket 11. The fuel finally passes from the upper disc 1 to the lower disc 4, the axis of rotation $m$ of which is eccentrically disposed relative to the axis of rotation $a$ of disc 1. As a result the portion of the surface of lower disc 4 not covered by upper disc 1 as the discs revolve becomes increasingly greater in one half and less in the other. In the latter case therefore the fuel is forced inwardly by the back pressure of the downwardly projecting inner edge of upper disc 1 and finally passes to the discharge point $q$ for slag and ashes (Fig. 10).

The fuel outlet 2 is provided with a slide 35 adapted to be raised and lowered, for regulating the thickness of the layer of fuel discharged. Located above the grate is a heat exchange surface in the form of tubular coils 38. The jacket of the fire box is double walled. The space between the walls 11 and 49 serves for preheating the combustion air, which is passed both under the grate and also through the lateral, grate-like protective walls 33 above the grate (Fig. 9). The bearing 57 for the lower disc 4 is also provided with air passages 60 (Fig. 9), in order to prevent fuel and slag from caking at this point.

The fuel could also be delivered at two diametrally opposed points, thus more uniformly charging the grate.

Figure 14:
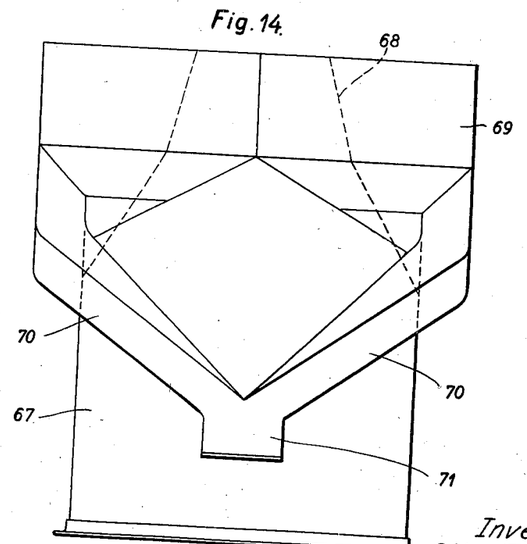
Fig. 14 is a side elevation of the exterior of a steam boiler provided with these rotary grates, together with the coal hopper.

Figs. 11 to 14 show still another form, using three annular grates. In these figures, the grate assembly comprises an upper annular grate 61, a lower annular grate 62 and an intermediate annular grate 63. The upper and lower annular grates 61 and 62 are journalled to rotate about a common vertical axis 64, which is the central axis of these annular grates, while annular grate 63 is rotatable about its central axis 65, which is mounted eccentric to the axis 64. Located above the grates is the heating surface of the steam generator formed of pipe coils 66 or the like, the outer jacket of which is designated by 67. The upper part 68 of this jacket 67 is constricted conically, by reason of the form of the heating surfaces which it encloses. As shown in Fig. 14, the free space at the upper end resulting from this constriction is utilized as a coal reservoir, by providing around the upper constricted portion 68 of the boiler jacket a coal bunker 69 extending therearound, from which the coal passes through lateral passages 70 to the lower outlet 71 which is located at the outer periphery of the grate assembly above the upper annular grate 61.

Figure 11:
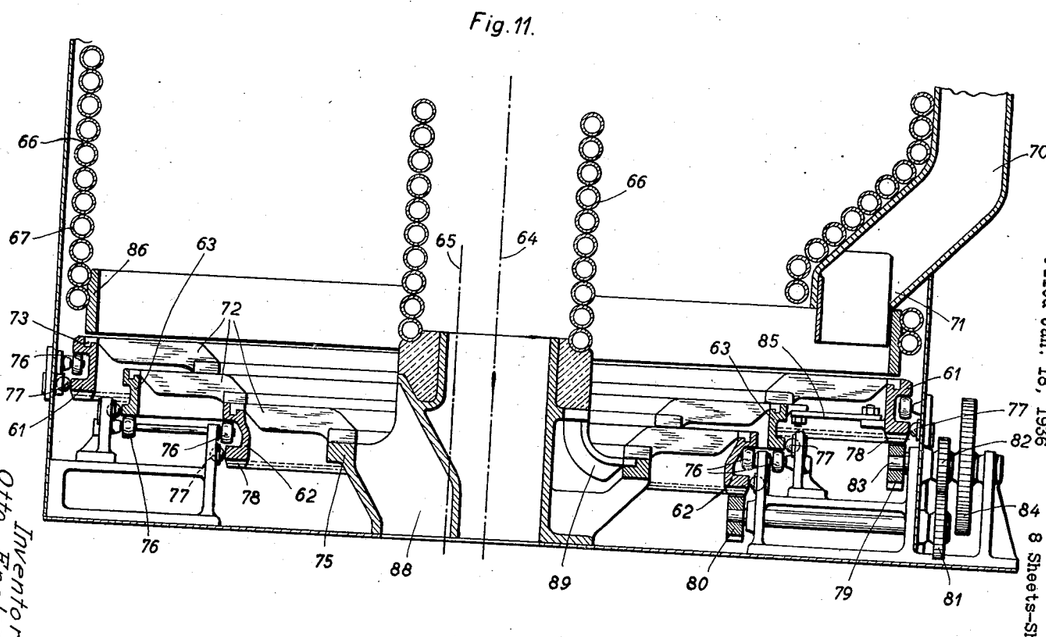
Fig. 11 shows in vertical axial section a furnace with three rotary grate discs.
Figures 11A, 12:
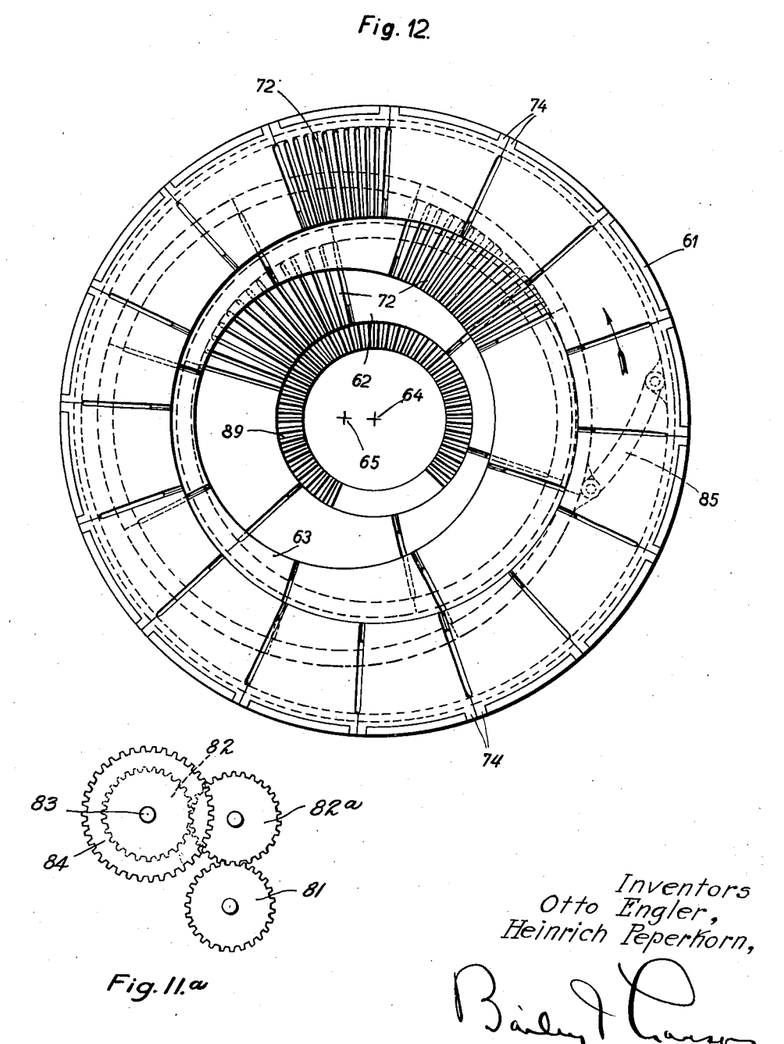
Fig. 11a is a side view showing the gearing of Fig. 11.
Fig. 12 is a plan view of the grates of Fig. 11.
Figure 13:
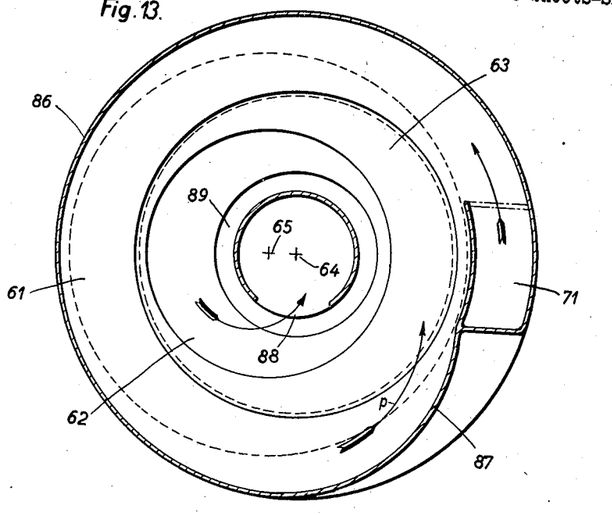
Fig. 13 is a diagrammatic plan view of the grates shcwing the movement of the coal from the delivery to the discharge point.

Figs. 11 and 12 show the construction of the individual grate sections. In this embodiment each annular grate is composed of sector-shaped grate bars 72, which make up the annular grates 61, 62 and 63. To hold the bars in position, the rods 72 are provided with projections 73 which engage in annular grooves in the grate rings, and also with radially directed projections 74 which engage in notches in the surfaces of the grate rings. The inner ends of the rods which form the upper and intermediate annular grates rest on the next lower annular grates, while the rods which form the lowermost annular grate are mounted at their inner ends on a stationary frame member 75. The individual grate bars and also the annular grates are thus secured in their proper relative position. The inner ends of the grate elements can also be arranged otherwise, for example, in the manner shown in Figs. 3 and 9, either on stationary annular frames, or supported on rotatable frame members. Each annular grate, as shown in Fig. 11, is rotatably mounted on rollers 76 and guided laterally by ball bearings 77.

In the embodiment shown, use is made of a gear drive to rotate the annular grates. The upper annular grate 61 and the lower annular grate 62 are provided on their under sides with crown gears 78 with which gears 79 and 80 mesh. Mounted on the shaft of gear 80 is a gear 81 which meshes with a gear 82a (Fig. 11a) engaging gear 82 on shaft 83 of gear 79. Also mounted on shaft 83 is the driving gear 84 which is driven, for example, by a pawl and ratchet mechanism (not shown). The upper annular grate 61 is connected with the central annular grate 62 by a pivoted link 85. The arrangement and transmission ratio between the different gears is selected so that the annular grates rotate in the same direction and at substantially the same angular velocity.

Above the upper annular grate 61 is a vertical substantially cylindrical crown 86, running around the outer edge of the grate. This crown extends from the coal outlet 71 around the grate and then turns inwardly at the point 87. This portion 87 serves as a guide or deflecting wall for guiding the fuel which falls from the outlet 71 onto the surface of the upper annular grate inwardly out of the circular path which it describes when turning with the revolving annular grate 61, as shown by the arrow p in Fig. 13. As a result the fuel is forced, through the action of guide wall 87, to fall onto the intermediate annular grate 63, which is journalled eccentrically with respect to the upper annular grate. Because of this eccentric mounting, the portion of the surface of central annular grate 63 not covered by upper annular grate 61 increases on one half and decreases on the other as the annular grates rotate. The fuel passes first from the upper annular grate 61 to the portion of the surface of the intermediate annular grate 63 which projects from beneath the annular grate 61. As intermediate annular grate 63 passes in its rotation below upper annular grate 61, the fuel is deflected inwardly by the inner edge of the upper annular grate 61 and forced off of intermediate annular grate 63 onto the lower annular grate 62, where it follows the same course as described above for annular grates 62 and 63. The fuel passes from the lowest annular grate into the discharge passage 88 (Figs. 11 and 12).

The fuel thus describes a spiral path from the delivery point 71 to the discharge point 88. The fuel layer is not agitated or scattered anywhere between the point of introduction and the outlet, as the fuel falling from one annular grate drops on another which is rotating at the same angular velocity and in the same direction. Through the cooperation of the lower annular grate with the inner edge of the next higher annular grate the fuel is forced radially toward the inner edge of the lower annular grate.

The bearing crown or frame 75 for the lower annular grate 62 is provided with a grate-like ring 89 (Figs. 11 and 12) for preventing deposition or caking of fuel and slag at this point.

The grate may, of course, be driven in some other fashion. For example, only one annular grate might be driven and this could be connected with the two other annular grates so that the three would rotate at the same angular velocity and in the same direction. Again, the upper annular grate 71 might be provided with a crown gear with which a pawl engages. The grate may also be differently constructed. For example, the sector-like sections of the grate surface shown in Fig. 12, or the entire grate surface, may be formed of individual rods.

The relative movement of the annular grates, in addition to the automatic cleaning of the surface of the lower annular grates, has the further advantage that the lower annular grates are well cooled during the periods in which these annular grates, in their movement, pass beneath the higher annular grates.

While we have described herein some embodiments of our invention, we wish it to be understood that we do not intend to limit ourselves thereby except within the scope of the appended claims.

We claim:

1. In a furnace for steam generators or the like, a revolving grate comprising at least two superposed rotatable discs, one of said discs being rotatable about an axis which is out of alignment with the axis of rotation of the other disc, means to rotate said discs, means to feed fuel to the surface of the upper disc, and means to force the fuel to travel in a spiral path on the upper disc and to pass off said surface onto the lower disc.

2. In a furnace for steam generators or the like, a revolving grate comprising at least two superposed rotatable discs, one of said discs being rotatable about an axis which is out of aligning with the axis of rotation of the other disc, means to rotate said discs, means to feed fuel to the surface of the upper disc, and means to force the fuel to travel in a spiral path on the upper disc and to pass off said surface onto the lower disc at a point angularly displaced in a direction opposite the direction of rotation of the discs from the point at which the surface of the lower discs extends farthest from beneath the surface of the upper disc.

3. In a device as claimed in claim 1, each of said discs rotating about its center.

4. In a furnace for steam generators or the like, a revolving grate comprising a plurality of superposed rotatable discs, alternate discs being rotatable about one axis, the remaining discs being rotatable about an axis which is out of alignment with said first axis, means to rotate said discs, means to feed fuel to the surface of the upper disc, means to force the fuel to travel in a spiral path on the upper disc and to pass off said surface onto the next lower disc.

5. In a device according to claim 1, said fuel feeding means supplying fuel to the surface of the upper disc at a point adjacent but slightly spaced from the axis of rotation thereof.

6. In a device according to claim 1, said fuel feeding means supplying fuel to the surface of the upper disc over an area the center of which is adjacent but slightly spaced from the axis of rotation of said upper disc, and angularly displaced in a direction opposite the direction of rotation of the discs from the line joining the axes of rotation of the discs.

7. In a furnace for steam generators or the like, a revolving grate comprising at least two superposed rotatable discs, the upper disc being rotatable about an axis which is out of alignment with the axis of rotation of the lower disc, the upper disc being smaller than the lower disc, means to rotate said discs, means to feed fuel to the surface of the upper disc adjacent the center thereof, means to force the fuel to travel in a spiral path on the upper disc from the center outwardly and to pass off said surface onto the next lower disc at the outer edge of the disc onto the lower disc.

8. In a furnace for steam generators or the like, a revolving grate comprising at least two superposed rotatable discs, the upper disc being rotatable about an axis which is out of alignment with the axis of rotation of the lower disc, the upper disc being smaller than the lower disc, means to rotate said discs, means to feed fuel to the surface of the upper disc adjacent the center thereof, means to force the fuel to travel in a spiral path on the upper disc from the center outwardly and to pass off said surface onto the next lower disc at the outer edge of the disc onto the lower disc and means to force the fuel on the lower disc to travel outwardly in a spiral path to the edge thereof.

9. In a furnace for steam generators or the like, a revolving grate comprising at least two superposed rotatable discs, the upper disc being rotatable about an axis which is out of alignment with the axis of rotation of the lower disc, said upper disc having a central opening therein, means to rotate said discs, means to feed fuel to the surface of the upper disc adjacent the periphery thereof, means to force the fuel to travel in a spiral path on the upper disc inwardly and to pass off said surface through said opening onto the lower disc.

10. In a furnace for steam generators or the like, a revolving grate comprising at least two superposed rotatable discs, the upper disc being rotatable about an axis which is out of alignment with the axis of rotation of the lower disc, said upper disc having a central opening therein, means to rotate said discs, means to feed fuel to the surface of the upper disc adjacent the periphery thereof, means to force the fuel to travel in a spiral path on the upper disc inwardly and to pass off said surface through said opening onto the lower disc, said lower disc also having a central opening therein, smaller than said first opening, and means to force the fuel on the lower disc to travel inwardly in a spiral path to said opening.

11. In a furnace for steam generators or the like, a furnace jacket, rollers carried by said jacket, a stationary frame member within said jacket, rollers carried by said frame member, a hub journalled in said frame member, an upper grate disc, means securing said upper disc to said hub, a lower grate disc supported and guided by said rollers, the upper disc being rotatable about an axis which is out of alignment with the axis of rotation of the lower disc, means to rotate said discs, means to feed fuel to the surface of the upper disc, means to force the fuel to travel in a spiral path on the upper disc, and to pass off said surface onto the next lower disc.

12. In a device according to claim 11, said securing means comprising a bayonet joint.

13. In a device according to claim 1, the upper disc having air openings in the periphery thereof.

14. In a device according to claim 1, the upper disc having teeth on its lower surface.

15. In a furnace for steam generators or the like, a furnace jacket, a revolving grate within said jacket, comprising at least two superposed rotatable discs, one of said discs being rotatable about an axis which is out of alignment with the axis of rotation of the other disc, the axes of rotation of both said discs being out of alignment with the axis of said furnace jacket, means to rotate said discs, means to feed fuel to the surface of the upper disc, means to force the fuel to travel in a spiral path on the upper disc and to pass off said surface onto the next lower disc.

16. In a furnace for steam generators or the like, a furnace jacket, a revolving grate within said jacket, comprising at least two superposed rotatable discs, one of said discs being rotatable about an axis which is out of alignment with the axis of rotation of the other disc, the axes of rotation of both said discs being out of alignment with the axis of said furnace jacket, means to feed fuel to the upper disc adjacent the periphery thereof, means to force the fuel to travel in a spiral path on the upper disc and to pass off said surface onto the next lower disc.

17. In a furnace for steam generators or the like, a revolving grate comprising three superposed rotatable discs, the upper and lower discs being rotatable about a common axis which is out of alignment with the axis of rotation of the intermediate disc, means to rotate said discs in the same direction at the same angular velocity, means to feed fuel to the surface of the upper disc, means to force the fuel to travel in a spiral path on the upper disc and to pass off said surface onto the intermediate disc.

18. In a furnace for steam generators or the like, a revolving grate comprising three superposed rotatable discs, the upper and lower discs being rotatable about a common axis which is out of alignment with the axis of rotation of the intermediate disc, means for positively driving at least one of said discs, means connecting any undriven disc to a driven disc to rotate therewith, means to feed fuel to the surface of the upper disc, means to force the fuel to travel in a spiral path on the upper disc and to pass off said surface onto the intermediate disc.

19. In a furnace for steam generators or the like, a jacket, a fuel reservoir positioned in the upper part of said jacket, a revolving grate comprising at least two superposed rotatable discs, one of said discs being rotatable about an axis which is out of alignment with the axis of rotation of the other disc, means to rotate said discs, said furnace having a lateral passage connected to said fuel reservoir and terminating adjacent the periphery of the upper disc to feed fuel thereto, a portion of the wall of said reservoir being turned inward and extending down to said upper disc to engage the fuel and force it to travel inwardly in a spiral path on the upper disc and to pass off said surface onto the next lower disc.

20. In a furnace for steam generators or the like, a jacket, a fuel reservoir positioned in the upper part of said jacket, a revolving grate comprising at least two superposed rotatable discs, one of said discs being rotatable about an axis which is out of alignment with the axis of rotation of the other disc, means to rotate said discs, said furnace having a lateral passage connected to said fuel reservoir and terminating adjacent the periphery of the upper disc to feed fuel thereto, a crown above said upper disc adjacent the periphery thereof, a portion of said crown extending inwardly to engage the fuel on the upper disc and force it to travel inwardly in a spiral path on the upper disc and to pass off said surface onto the next lower disc.

OTTO ENGLER.
HEINRICH PEPERKORN.